(12) United States Patent
Noll et al.

(10) Patent No.: US 8,326,553 B2
(45) Date of Patent: Dec. 4, 2012

(54) FAULT DETECTION IN A SYSTEM UNDER CONTROL

(75) Inventors: Christopher Noll, Glastonbury, CT (US); Steven A. Avritch, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 452 days.

(21) Appl. No.: 12/652,347

(22) Filed: Jan. 5, 2010

(65) Prior Publication Data

US 2011/0166676 A1 Jul. 7, 2011

(51) Int. Cl.
*G05B 23/02* (2006.01)
*G06F 11/22* (2006.01)
*G06F 19/00* (2011.01)
*G06F 17/40* (2006.01)

(52) U.S. Cl. ............ 702/58; 73/865.8; 324/750.01; 702/108; 702/182; 702/183; 708/105; 708/200

(58) Field of Classification Search ............ 73/432.1, 73/865.8, 865.9; 324/500, 537, 750.01, 762.01, 324/763.01; 700/1, 90; 702/1, 33, 35, 57, 702/58, 108, 113, 114, 115, 117, 127, 182, 702/183, 187, 188, 189; 708/100, 105, 200

See application file for complete search history.

(56) References Cited

U.S. PATENT DOCUMENTS

| | | | | |
|---|---|---|---|---|
| 3,082,374 A | * | 3/1963 | Buuck | 324/73.1 |
| 3,492,572 A | * | 1/1970 | Jones et al. | 714/740 |
| 4,214,301 A | | 7/1980 | Kurihara et al. | |
| 4,509,110 A | | 4/1985 | Levesque, Jr. et al. | |
| 5,049,799 A | | 9/1991 | Tsai | |
| 5,806,805 A | | 9/1998 | Elbert et al. | |
| 7,003,949 B2 | | 2/2006 | Fenny et al. | |
| 7,059,563 B2 | | 6/2006 | Huynh | |

FOREIGN PATENT DOCUMENTS

WO WO9830940 7/1998

OTHER PUBLICATIONS

European Search Report dated May 11, 2011, European Application No. 11250004.6.

* cited by examiner

*Primary Examiner* — Edward Cosimano
(74) *Attorney, Agent, or Firm* — Cantor Colburn LLP

(57) ABSTRACT

A method (300) for fault detection in a system under control includes monitoring a command value and a wraparound signal (301) by a fault detection module (203); determining a standard deviation of the command value (302) by the fault detection module; determining a standard deviation of the wraparound signal (303) by the fault detection module; determining a ratio of the standard deviation of the command value to the standard deviation of the wraparound signal (304) by the fault detection module; and determining the presence or absence of a fault in the system under control by the fault detection module based on the ratio (305) by the fault detection module. A fault detection module (203) and a computer program product comprising a computer readable storage medium containing computer code that, when executed by a computer, implements a method (300) for fault detection are also provided.

20 Claims, 4 Drawing Sheets

FAULT DETECTION IN A SYSTEM UNDER CONTROL

FIELD OF INVENTION

The subject matter disclosed herein generally to the field of error detection in a system under control.

DESCRIPTION OF RELATED ART

A control system may comprise a controller connected by an electrical wiring harness to a system under control. The system under control may be any mechanical or electrical system, including but not limited to an electro-hydraulic servo valve (EHSV). Fault detection in such a system may be performed by continuously monitoring a command signal from the controller and a wraparound signal, and subtracting the command signal from a wraparound signal to determine an error value. The error value may then be compared to an error threshold limit to determine if there is a fault, such as an open or short, in the system. The error threshold limit must account for error sources that are inherent to the wraparound signal, including system error (gain and offset), phase shift from command signal to wraparound signal, latency, and random noise. These error sources may be cumulative, leading to a relatively large error band and negatively impacting fault detection ability. It may be difficult to select an error threshold limit that balances maximized fault detection capability with minimized probability of false fault detection across the full range of command values. For a high frequency valve, in particular, the average command value may be lower than the amount of inherent error in the wraparound signal under normal operation, making detection through comparison unreliable.

BRIEF SUMMARY

According to one aspect of the invention, a method for fault detection in a system under control includes monitoring a command value and a wraparound signal by a fault detection module; determining a standard deviation of the command value by the fault detection module; determining a standard deviation of the wraparound signal by the fault detection module; determining a ratio of the standard deviation of the command value to the standard deviation of the wraparound signal by the fault detection module; and determining the presence or absence of a fault in the system under control by the fault detection module based on the ratio by the fault detection module.

According to one aspect of the invention, a fault detection module is configured to detect a fault in a system under control, the fault detection module further configured to monitor a command value and a wraparound signal; determine a standard deviation of the command value; determine a standard deviation of the wraparound signal; determine a ratio of the standard deviation of the command value to the standard deviation of the wraparound signal; and determine the presence or absence of a fault in the system under control based on the ratio.

According to one aspect of the invention, a computer program product comprising a computer readable storage medium containing computer code that, when executed by a computer, implements a method for fault detection in a system under control, wherein the method includes monitoring a command value and a wraparound signal; determining a standard deviation of the command value; determining a standard deviation of the wraparound signal; determining a ratio of the standard deviation of the command value to the standard deviation of the wraparound signal; and determining the presence or absence of a fault in the system under control by the fault detection module based on the ratio.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for fault detection in a system under control are provided, with exemplary embodiments being discussed below in detail.

In a control system that comprises a closed loop, a wraparound signal may closely track a command value; the wraparound signal and the command value may only differ by the inherent error present in the wraparound circuit, which may be a simple offset. Therefore, the standard deviation of the command value and the standard deviation the wraparound signal may also be close under normal operation. Calculating a running standard deviation of each of the control value and of the wraparound signal and calculating a ratio of the two standard deviations allows for accurate detection of faults, such as shorts or opens, in the wraparound signal. In normal operation, the ratio of the two standard deviations is close to 1.0; a fault may be detected by a step change in the ratio of the standard deviations.

Use of standard deviations allows a fault to be detected accurately in the system under control in the case where the command value approaches the amount of error found in the wraparound circuit under normal operation, neutralizing the effects of inherent error sources such as gain/offset error, phase delay, latency, and random uncorrelated noise. Trend correlation between the control signal and wraparound signal also neutralizes the effects of time invariant steady state errors and random noise. The tolerance band for fault detection may be narrowed, facilitating the detection of faults that reside below the signal to noise ratio of the wraparound circuit.

Figure 1:
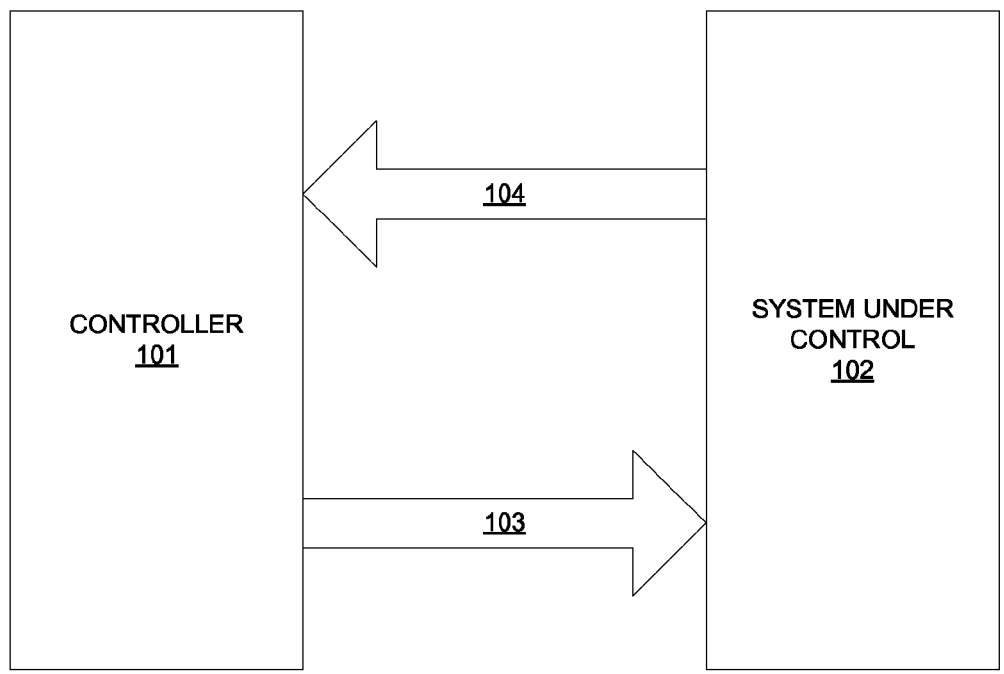
FIG. 1 illustrates an embodiment of a control system comprising a system under control.

FIG. 1 illustrates an embodiment of a control system 100 comprising a controller 101 and system under control 102 that is controlled by controller 101. System under control 102 may comprise any appropriate mechanical or electrical system, including but not limited to an EHSV. Controller 101 generates a command value in software. The command value is then converted to a physical command signal, which may comprise a specific voltage or current configured to control the system under control 102. The physical command signal is sent to system under control 102 via wiring harness 103. The physical command signal causes system under control 102 to carry out the command contained in the command signal. A wraparound signal from system under control 102 is sent back to controller 101 via wiring harness 104. Wiring harness 103 and wiring harness 104 are shown for illustrative purposes only, any appropriate wiring configuration may connect controller 101 and system under control 102.

Figure 2:
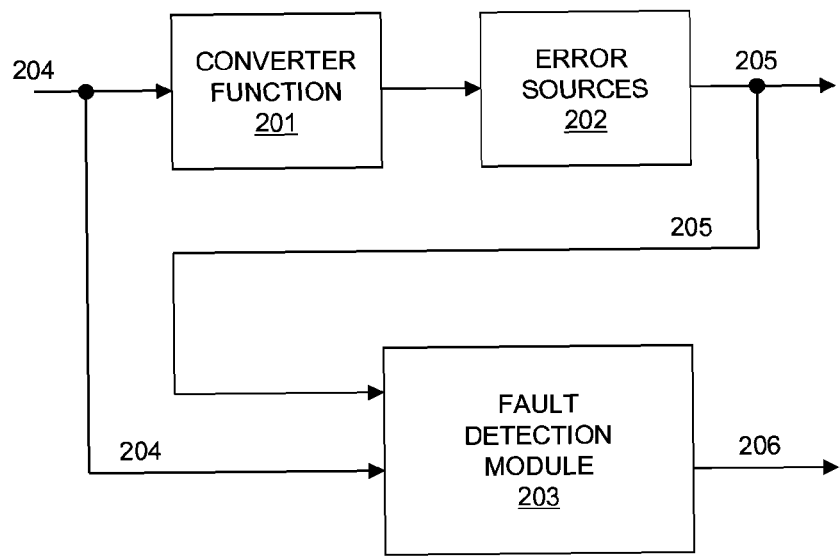
FIG. 2 illustrates an embodiment of a fault detection system.

FIG. 2 illustrates an embodiment of a fault detection module 203. FIG. 2 is discussed with reference to FIG. 1. A command value 204 from controller 101 is input to fault detection module 203, which may be located in controller 101 in some embodiments. The command value 204 is also sent through converter function 201, which may also be located in controller 101 in some embodiments. The converter function 201 outputs a physical command signal to system under control 102. The physical command signal controls system under control 102, and becomes wraparound signal 205.

The command value and physical command signal may encounter faults, such as opens or shorts, and error sources 202 en route to wraparound 205. Error sources 202 may comprise any inherent error in the wraparound circuit (including wiring 103/104, controller 101, and system under control 102), including but not limited to gain or offset errors, phase errors, latency, or noise. The wraparound signal 205, which reflects the sum of the command value 204 plus any error sources 202 and any faults that may exist in system under control 100, is input to fault detection module 203. Fault detection module 203 determines whether fault conditions exist in wraparound signal 205 based on command value 204, and outputs the fault determination at output 206.

Figure 3:
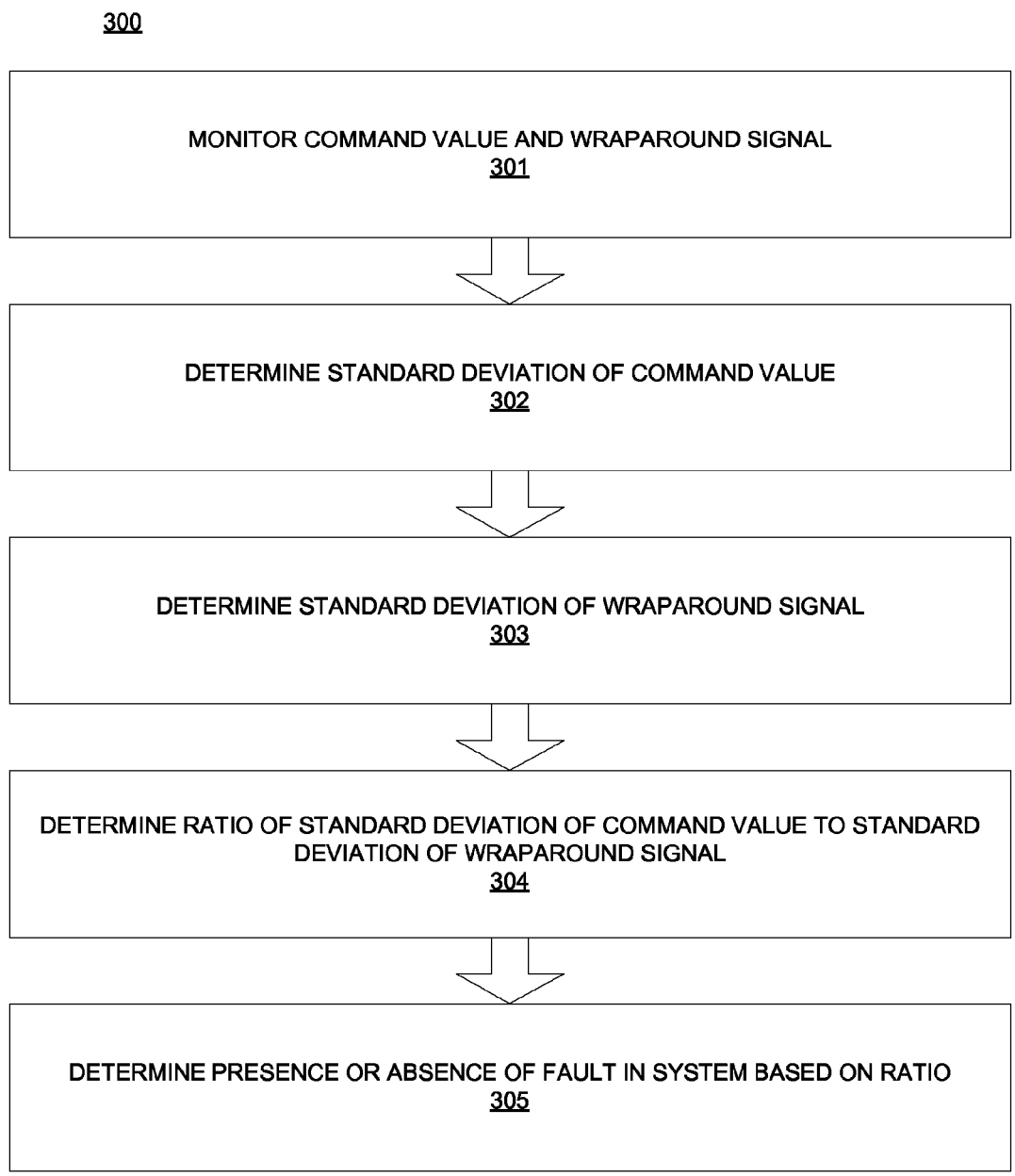
FIG. 3 illustrates an embodiment of a method for fault detection in a system under control.

FIG. 3 illustrates an embodiment of a fault detection method 300 that may be embodied in fault detection module 203. FIG. 3 is discussed with reference to FIG. 2. In block 301, the fault detection module continuously monitors the command value 204 and the wraparound signal 205. In block 302, a running standard deviation for the command value 204 is determined. In block 303, a running standard deviation for the wraparound signal 205 is determined. In block 304, a ratio of the running standard deviation of the command value 204 to the running standard deviation of the wraparound signal 205 is determined. In block 305, the presence of a fault is determined based on the ratio determined in block 304. In normal operation, the ratio of the standard deviations that is calculated block 304 may be close to 1.0; a fault may be detected by a step change in the ratio of the standard deviations.

Figure 4:
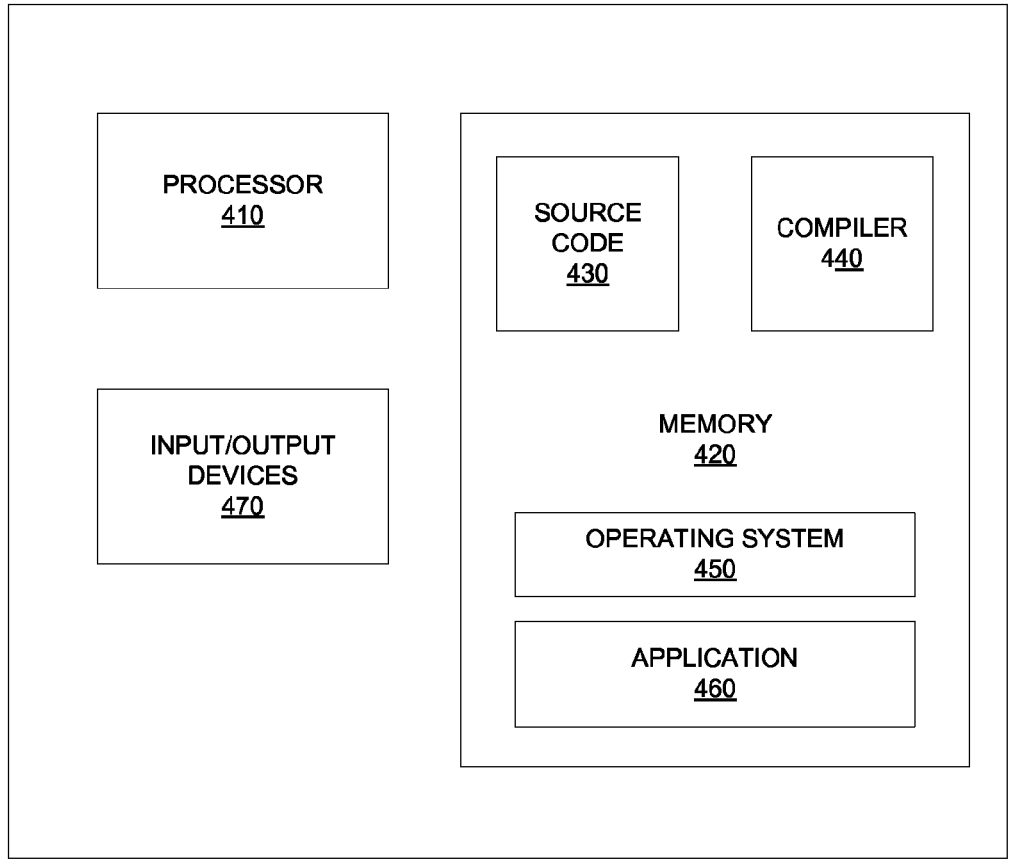
FIG. 4 illustrates an embodiment of a computer that may be used in conjunction with embodiments of systems and methods for fault detection in a system under control.

FIG. 4 illustrates an example of a computer 400 which may be utilized by exemplary embodiments of a method for fault detection for a system under control as embodied in software. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, embedded controllers, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include accurate fault detection in a system under control.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method (300) for fault detection in a system under control, the method comprising:
    monitoring a command value and a wraparound signal (301) by a fault detection module (203);
    determining a standard deviation of the command value (302) by the fault detection module;
    determining a standard deviation of the wraparound signal (303) by the fault detection module;
    determining a ratio of the standard deviation of the command value to the standard deviation of the wraparound signal (304) by the fault detection module; and
    determining the presence or absence of a fault in the system under control by the fault detection module based on the ratio (305) by the fault detection module.

2. The method (300) of claim 1, wherein the fault detection module determines the presence of a fault in the system under control in the event a step change is detected in the ratio.

3. The method (300) of claim 1, wherein the fault detection module determines the absence of a fault in the system under control in the event the ratio is about 1.0.

4. The method (300) of claim 1, wherein a fault comprises an open or short in the system under control.

5. The method (300) of claim 1, wherein the system under control is controlled by a controller, and a wiring harness connects the controller to the system under control, and wherein the fault detection module is located in the controller.

6. The method (300) of claim 5, wherein the command value is issued by the controller, and wherein the command value is converted to a physical command signal, the physical command signal being received by the system under control from the controller, the physical command signal being configured to control the system under control, and wherein the wraparound signal is received by the fault detection module from the system under control.

7. The method (300) of claim 5, wherein the system under control comprises an electro-hydraulic servo valve (EHSV).

8. A fault detection module (203) configured to detect a fault in a system under control, the fault detection module further configured to:
    monitor a command value (204) and a wraparound signal (205);
    determine a standard deviation of the command value (204);
    determine a standard deviation of the wraparound signal (205);
    determine a ratio of the standard deviation of the command value (204) to the standard deviation of the wraparound signal (205); and
    determine the presence or absence of a fault in the system under control based on the ratio.

9. The fault detection module (203) of claim 8, wherein the fault detection module determines the presence of a fault in the system under control in the event a step change is detected in the ratio.

10. The fault detection module (203) of claim 8, wherein the fault detection module determines the absence of a fault in the system under control in the event the ratio is about 1.0.

11. The fault detection module (203) of claim 8, wherein a fault comprises an open or short in the system under control.

12. The fault detection module (203) of claim 8, wherein the system under control is controlled by a controller, and a wiring harness connects the controller to the system under control, and wherein the fault detection module is located in the controller.

13. The fault detection module (203) of claim 12, wherein the command value (204) is issued by the controller, and wherein the command value (204) is converted by a converter (201) to a physical command signal, the physical command signal being received by the system under control from the controller, the physical command signal being configured to control the system under control, and wherein the wraparound signal (205) is received by the fault detection module from the system under control.

14. The fault detection module (203) of claim 12, wherein the system under controle comprises an electro-hydraulic servo valve (EHSV).

15. A computer program product comprising a computer readable storage medium containing computer code that, when executed by a computer, implements a method (300) for fault detection in a system under control, wherein the method comprises:
   monitoring a command value and a wraparound signal (301);
   determining a standard deviation of the command value (302);
   determining a standard deviation of the wraparound signal (303);
   determining a ratio of the standard deviation of the command value to the standard deviation of the wraparound signal (304); and
   determining the presence or absence of a fault in the system under control by the fault detection module based on the ratio (305).

16. The computer program product according to claim 15, wherein the fault detection module determines the presence of a fault in the system under control in the event a step change is detected in the ratio.

17. The computer program product according to claim 15, wherein the fault detection module determines the absence of a fault in the system under control in the event the ratio is about 1.0.

18. The computer program product according to claim 15, wherein the system under control is controlled by a controller, and a wiring harness connects the controller to the system under control, and wherein the fault detection module is located in the controller.

19. The computer program product according to claim 18, wherein the command value is issued by the controller, and wherein the command value is converted to a physical command signal, the physical command signal being received by the system under control from the controller, the physical command signal being configured to control the system under control, and wherein the wraparound signal is received by the fault detection module from the system under control.

20. The computer program product according to claim 18, wherein the system under control comprises an electro-hydraulic servo valve (EHSV).

* * * * *